Dec. 12, 1967     J. H. SCHMID ET AL     3,357,566

DUAL ELEMENT FILTER ASSEMBLY WITH BACKWASH ARMS

Filed June 22, 1964

INVENTORS
JOHN H. SCHMID
RAMON J. ZENTIS

Charles L. Lovercheck
Attorney

United States Patent Office 3,357,566
Patented Dec. 12, 1967

3,357,566
DUAL ELEMENT FILTER ASSEMBLY
WITH BACKWASH ARMS
John H. Schmid, Erie, and Ramon J. Zentis, McKean, Pa., assignors to Zurn Industries, Inc., Erie, Pa., a corporation of Pennsylvania
Filed June 22, 1964, Ser. No. 376,991
12 Claims. (Cl. 210—333)

This invention relates to strainers and, more particularly, to strainers of the type frequently used in water supply lines.

The strainer disclosed herein constiutes an improvement over the strainer disclosed in patent application, Ser. No. 292,896, filed July 5, 1963, by John H. Schmid et al., and now U.S. Patent No. 3,256,995.

In the present application, the strainer elements are vertically spaced from each other. The cylindrical construction makes it possible for the strainer to be made in the form of a cylinder and for the backwash arm to rotate through three hundred and sixty degrees. This construction has advantages in certain applications over the partial cylinders of the prior said application. It also provides advantages in manufacture of the strainer.

In the present strainer, the influent enters between the two vertically spaced strainer elements and flows both up and down from the center of the inlet, providing a low pressure drop and maintaining flow almost in a straight-through direction. The fact that the backwash shoes can rotate through full three hundred and sixty degrees without passing over the inlet opening also constitutes an advantage in operation.

It is, accordingly, an object of the present invention to provide an improved strainer.

Another object of the invention is to provide a strainer wherein axially spaced strainer baskets are disposed out of alignment with the inlet and influent flows from the inlet in opposite directions toward each of the individual strainer elements.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
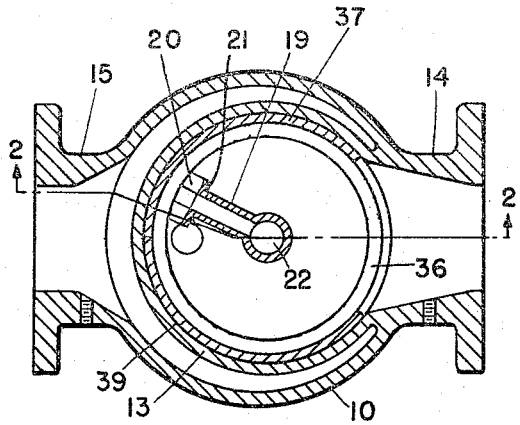
FIG. 1 is a cross sectional view of a strainer according to the invention taken on line 1—1 of FIG. 2.
Figure 3:
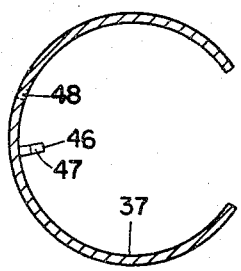
Figure 4:
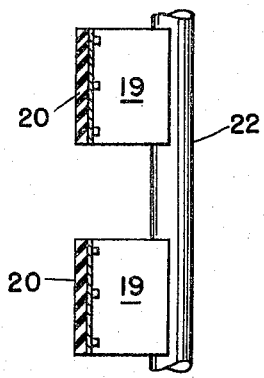
Figure 2:
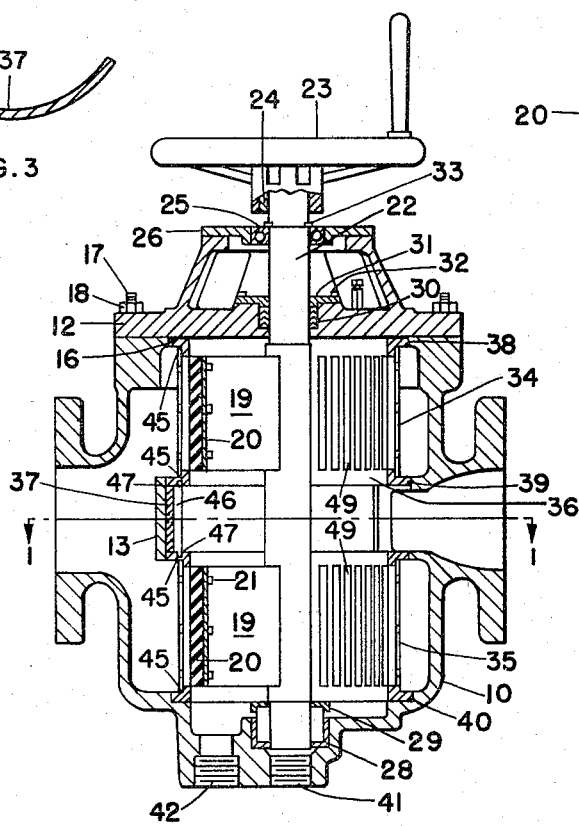
FIG. 2 is a longitudinal cross sectional view of the strainer taken on line 2—2 of FIG. 1.

FIG. 3 is a cross sectional view of the cage spacer taken on line 1—1 of FIG. 2; and FIG. 4 is a longitudinal view of the backwash arm and assembly made up of shaft 22 and arms 19.

Now with more particular reference to the drawing, the strainer shown has a body 10 having a flanged inlet 14 and an outlet 15 which may be connected in a suitable manner to a liquid line; for example, a water supply line.

The strainer is made up essentially of the body having two axially spaced strainer elements 34 and 35 therein which are supported in spaced relation by the cage spacer 37 in the spacer ring 13. The backwash arms 19 have spaced port seal shoes 20 connected thereto. The backwash arms are connected to a central shaft 22 which can thereby be rotated through complete revolutions to backwash the strainer.

The body 10 has an open top which is closed by the cover 12. A cover gasket 16 is provided between the cover and body and the cover is held in place by cover studs 17 and nuts 18.

The spacer ring 13 is an integral part of the body and is attached thereto around the inlet opening. The spacer ring has a machined inside surface 39 which is of equal diameter and coaxial with the surface 38 and the surface 40 around the inside of the open end and the closed end, respectively, of the strainer body.

The strainer elements 34 are generally cylindrical in shape. Each is made up of screen or other suitable mesh material having a generally cylindrical inside surface. The strainer element screen fits around the strainer element cages 36 which have vertical bars 49 shown and terminate in a suitable ring 45 at each end which fit in the machined surfaces 38, 39, and 40. The strainer element cages 36 have vertically extending spaced bars which provide slots therebetween and the port seals pass over these slots in succession and connect them to the inside of the backwash arms. The two adjacent end rings rest on the cage spacer 37 which holds them in spaced relation. This cage spacer is generally C-shaped with the open part of the C adjacent the inlet opening. The strainer elements are held together by the cover which rests on the end of the upper strainer and holds them in the position shown.

The cage spacer 37 has a bar 46 attached to its inside periphery. This bar extends radially inwardly and underlies the adjacent ends of the rings 45. The rings 45 have axially extending openings which receive the ends 47 of the bar 46. Thus, bar 46 prevents the rotation of the strainer element cage 36 by debris trapped between the bars 49 and the rotating backwash arm. The cage spacer 37 is fastened to the spacer ring 13 by means of a screw extending through hole 48 in the cage spacer 37 and threadably engaging spacer ring 13.

The backwash arm and assembly are made up of the shaft 22 which is coaxial with the central axis of the cylindrical strainer elements. The shaft 22 is supported in suitable bearings in the end of the strainer body and cover and has the backwash arms 19 fixed thereto. The lower end of the shaft is supported in the lower bearing 28 with a suitable bearing water control ring 29 supported thereover. The upper end of the shaft is supported in the top bearing 25 and suitable packing 30 is held in place around the shaft by means of the packing gland 31 held in place by cap screws 32 in a conventional type of packing gland. The shaft may be secured against end play by means of a suitable shaft retaining ring 33.

The backwash arms 19 are hollow and the hollow therein communicates with the inside of the hollow shaft 22. The backwash arms present an open slot to the inside of a segment of the screen. The shoes are fixed to the backwash arms and form a border around the slots. They are held thereto by means of cap screws 21 which extend through a flanged formed on the outer ends of the backwash arms. The shoes 20 may be made of resilient material such as rubber and they may engage the inside surface of the spaced bars of the strainer element cage 36 as they rotate. It has been discovered that it is desirable to maintain a slight clearance between the resilient shoes 20 and the inside of the cage 36 to prevent wear of the parts. This clearance may be of the magnitude, for example, of .005 to .010 inch. Thus, a pressure differential is provided on the downstream side of the screen over the particular slot and the segment of screen corresponding thereto registers at a particular time with the port in the backwash arms. Therefore, foreign material is washed from the screen back through the backwash arm and out through the exit 41.

A second drain opening 42 is provided at the lower end of the closed end of the body through which the strainer may be drained.

A handwheel 23 is shown attached to the shaft 22 by which it may be rotated. Obviously, a suitable motor and timing arrangement could be connected to the shaft 22 to drive it in accordance with a suitable program reference to the differential pressures between the inlet and outlet openings or other sensing device to backwash the strainer at suitable intervals.

It will be seen that when the strainer disclosed herein is connected to a suitable water line, water will flow through the inlet 14 and through the opening in the spacer ring 13 into the spacer ring and thence the flow will divide and a part thereof will proceed upwardly and the other part downwardly into the strainer elements from whence it will pass through the strainer elements to the outlet 15. It will also be seen that the strainer elements are set eccentric from the center of the body 10, thus providing a flow path for liquid around the outside of the strainer elements which increases in size from the inlet end to the outlet end for improved flow characteristics.

It will also be seen that the backwash arms may be rotated through complete three hundred and sixty degrees rotations to completely clean the inside of the strainer and direct the backwash water through the exit 41.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A strainer comprising
   a hollow body having an inlet and an outlet to be connected in a fluid line,
   two axially spaced, generally cylindrical strainer elements disposed in said body,
   and means to admit liquid from said inlet into the space between said elements,
   said elements being adapted to have said liquid flow through the sides thereof and to said outlet,
   a backwash arm provided in said strainer,
   said backwash arm having means thereon to move in close relation to the inside surface of said strainer elements,
   and means to move said backwash arm around the inside surface of said strainer elements.
2. The strainer recited in claim 1, wherein
   said means to move said backwash arm rotates said backwash arm through a complete revolution.
3. The strainer recited in claim 1 wherein
   said means to move said backwash arm comprises a shaft disposed generally coaxially with the central axes of said strainer elements,
   said backwash arm being attached to said shaft.
4. The strainer recited in claim 3 wherein
   said shaft is hollow and said backwash arm has means connecting it with the inside of said hollow shaft,
   said hollow shaft having means on the end thereof communicating with said means for connecting it to a discharge means.
5. The strainer recited in claim 1 wherein
   said means on said backwash arm engaging the inside surface of said strainer elements comprises an open slot in said backwash arm,
   and resilient members on each side of said slot for slidingly engaging said strainer elements.
6. A strainer comprising
   a body having an inlet and an outlet,
   a spacer ring having a circular surface on each end thereof and having the side fixed to said body adjacent said inlet,
   an opening in the side of said ring connecting the inside thereof with said inlet,
   and two strainer elements each in the form of a cylindrical screen,
   one said strainer element being disposed at each end of said ring,
   the end of each said element remote from said ring being adjacent an end of said body, a backwash arm disposed in said strainer, means on said backwash arm disposed adjacent the inside surface of said strainer elements, and means to rotate said backwash arm through complete rotations.
7. The strainer recited in claim 6 wherein
   a generally C-shaped cage spacer is disposed inside said spacer ring between said strainer elements,
   said strainer elements resting on said cage spacer,
   and means fastening said cage spacer to said ring,
   said S-shaped cage spacer defining on opening overlying said inlet.
8. A strainer comprising
   a body having an inlet and an outlet,
   two axially spaced, generally cylindrical strainer elements in said body, one disposed on the opposite side of said inlet from the other,
   means to admit fluid from said inlet to the inside of said elements,
   a hollow shaft in said body generally coaxial with the central axes of said elements,
   two backwash arms, one in each said strainer element, slidingly engaging the inside surface thereof,
   and means on said backwash arms connecting the inside of said hollow shaft in fluid flow relation with the surface of said strainer elements engaged by said backwash arms.
9. A strainer comprising
   a substantially cylindrical body having substantially axially aligned inlet and outlet openings therein,
   one end of said body being open,
   a cover closing said open end,
   a spacer ring in said body attached thereto adjacent one of said inlet and said outlet openings and having an opening therein communicating with said one of said inlet and outlet openings,
   a first cylindrical seating surface means disposed inside said body around said open end,
   a second cylindrical seating surdface on the inside surface of said ring,
   a third cylindrical seating surface on and around the inside of said body opposite said open end,
   said first, second, and third seating surfaces being of equal diameter and coaxial with each other,
   two spaced cylindrical annular strainer elements in said body with means thereon making substantially sealing engagement with said seating surfaces,
   and a separate cage spacer inside said ring and between said elements holding them in spaced relation to each other.
10. The strainer recited in claim 9 wherein
    said means making substantially sealing engagement with said surface comprises cages each comprising spaced, axially extending bars having a ring at each end thereof,
    said ring at each end of said bars received in said seating surfaces,
    a strainer element,
    one said strainer element being disposed around each said cage.
11. The strainer recited in claim 10 wherein said strainer elements are disposed in said body nearer said inlet than said outlet opening.

12. The strainer recited in claim 9 wherein means is provided fastening said cage spacer to said ring.

References Cited

UNITED STATES PATENTS

| 110,217 | 12/1870 | Dougherty | 210—340 |
| 968,822 | 8/1910 | Weinland | 210—324 |
| 2,940,517 | 6/1960 | Skellern | 210—330 X |
| 3,256,995 | 6/1966 | Schmid et al. | 210—446 X |
| 3,291,307 | 12/1966 | Rosaen | 210—323 X |

FOREIGN PATENTS

| 1,122,302 | 5/1956 | France. |

REUBEN FRIEDMAN, *Primary Examiner.*

F. A. SPEAR, *Assistant Examiner.*